March 30, 1943.    N. H. STEWART ET AL    2,315,294
METHOD OF BRAZING
Filed July 19, 1941
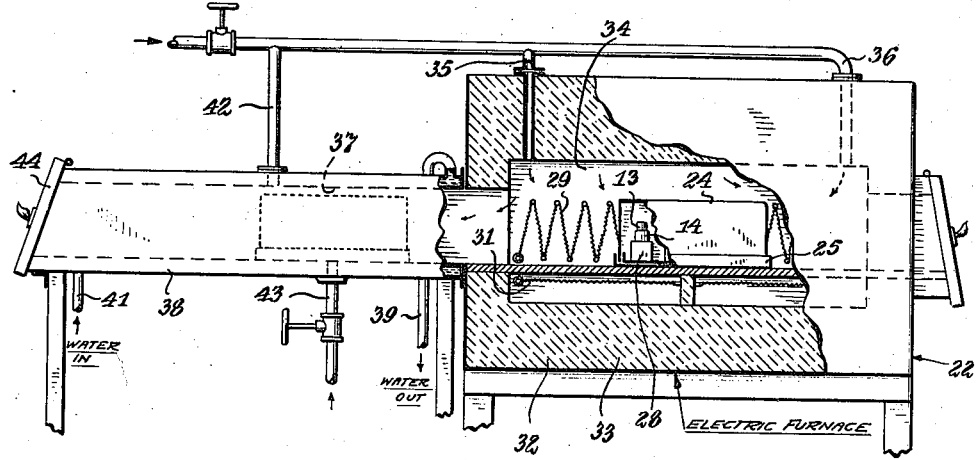
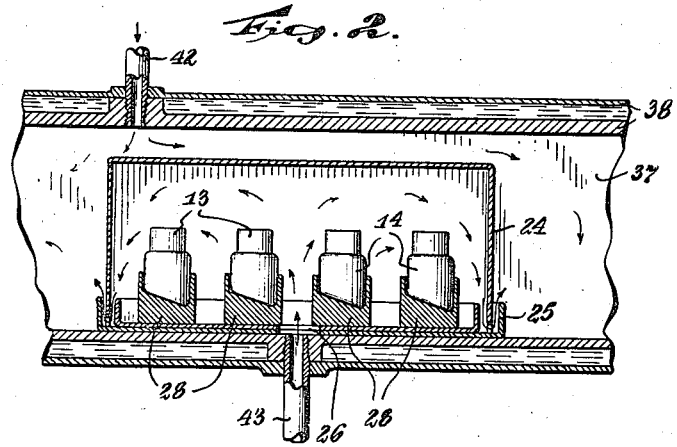
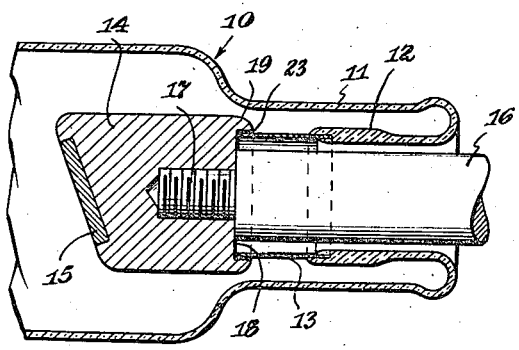
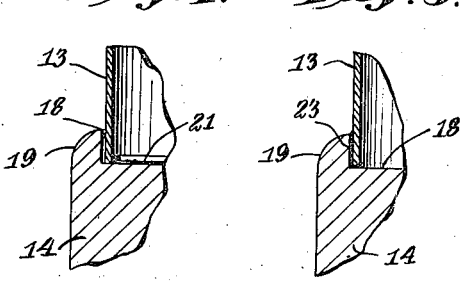
INVENTORS
N. H. STEWART
J. H. RAMAGE
BY
ATTORNEY Patented Mar. 30, 1943

2,315,294

UNITED STATES PATENT OFFICE 2,315,294

METHOD OF BRAZING

Nelson H. Stewart, Caldwell, and John H. Ramage, Bloomfield, N. J., assignors to Westinghouse Electric & Manufacturing Company, East Pittsburgh, Pa., a corporation of Pennsylvania Application July 19, 1941, Serial No. 403,133

9 Claims. (Cl. 113—112)

This invention relates to methods of brazing, and more particularly to the connection of parts formed of nickel-cobalt-iron alloy, generally designated as "Kovar," to other parts which may consist of copper.

The principal object of our invention, generally considered, is to connect elements together by means of brazing, using a cheap protective atmosphere while, at the same time, avoiding the injurious effects of carbon-bearing constituents thereof.

Another object of our invention is the performance of heat-treating operations as for the purpose of uniting parts by brazing, first in a cracked or carbon-bearing gas until the brazing metal melts and fills the space between the parts to be connected, and then cooling said connected parts in a non-contaminating gas, such as carbon dioxide, nitrogen or hydrogen, thereby avoiding the absorption of carbon by such materials as nickel or nickel alloys, and at the same time avoiding any large use of expensive gas.

A further object of our invention is the method of connecting a "Kovar" sleeve to a copper anode using a brazing material such as a silver alloy, by first heating to melt the alloy in a cheap gas, which may be carbon bearing and therefore have a tendency to contaminate the parts to be connected, particularly nickel or nickel alloy parts, and avoiding a possibly injurious effect of such gas by finally substituting a non-contaminating gas and allowing the parts to cool therein after the brazing operation has been performed.

Other objects and advantages of the invention, relating to the particular arrangement and construction of the various parts, will become apparent as the description proceeds.

Referring to the drawing:

Figure 1 is a side elevational view, partly in vertical section, of apparatus for practicing our invention.

Figure 2 is a fragmentary vertical sectional view of the cooling part of the apparatus shown in Figure 1.

Figure 3 is a fragmentary axial sectional view, partly in elevation, of a part of an X-ray tube having an anode and associated sleeve brazed together in accordance with our invention.

Figure 4 is a fragmentary sectional view illustrating parts of the sleeve, anode, and brazing material prior to melting said material.

Figure 5 is a view corresponding to Figure 4, but illustrating the next step where the brazing material has been melted so that it fills the space between the parts by capillary action.

We will now describe in detail, how "Kovar" sleeves are desirably connected to copper anodes for X-ray tubes, in accordance with our invention, it being understood, however, that the invention is not limited to the manufacture of such devices.

In brazing "Kovar" to other metals in a cracked or combusted gas furnace, it has been found necessary, in many cases, to retreat the "Kovar" in wet hydrogen subsequent to brazing and cooling in order to avoid bubbling in sealing it to glass. This has usually been attributed to carbon pick-up from the cracked gas atmosphere, although the exact form in which it is picked up is not clear. From experience with nickel wire, it appears that the nickel of the "Kovar," which is an alloy consisting of from 28.7 to 29.2% of nickel, 17.3 to 17.8% of cobalt, 52.9 to 53.4% of iron, not more than .06% of carbon, not more than .5% of manganese, and not more than .2% of silicon, picks up carbonaceous gases in cooling from higher temperatures, such as used in brazing, and that nickel carbonyl may also form during this cycle, which compound may break down under the influence of heat during glassing, thus creating bubbles in the seal.

The reason it is desired to use a combusted or cracked carbonaceous gas is because of its cheapness and ease in manufacture. The gas is desirably produced by burning air and city gas in a 2.28–1 ratio in the presence of a nickel catalyst, but may be the exhaust from an internal combustion engine. A typical analysis of such gas is 69% nitrogen, 13% hydrogen, 5% carbon dioxide, 12% carbon monoxide and .7% methane. Such a gas contains as constituents, those which may contaminate the parts to be connected by depositing carbon, and particularly the unstable carbon monoxide, but for economy it is desired to use such a gas.

When covered boats are used for enclosing the parts to be brazed, the injurious effect of using such carbonaceous gas can be avoided by equipping the cooling chamber with an auxiliary gas inlet, to match up with an aperture in each boat, through which other inactive or non-contaminating gases may be forced into the boat to displace the cracked or combusted gas during the cooling operation, that is, from the time the brazing metal solidifies until the connected parts are cool enough to be withdrawn from the apparatus. By this means the "Kovar" or other nickel-containing part is protected from the harmful effect of certain gases and particularly those which may deposit carbon thereon, and the necessity for subsequent treatment in the relatively expensive hydrogen is avoided.

In the drawing Figure 3 shows a portion of an X-ray tube 10, consisting of an envelope 11, having a re-entrant portion 12, to which is sealed a "Kovar" sleeve 13, carrying a copper anode 14 with a tungsten insert 15. Current is introduced to and cooling effected by means of a copper rod 16, threadably connected to the anode 14, as indicated at 17.

The "Kovar" sleeve 13 may be united with the copper anode 14 by boring out an end portion to provide a cavity or pocket 18 surrounded by a peripheral flange 19, inserting the "Kovar" sleeve 13 therein, and placing a ring of wire solder or brazing alloy 21, of lower melting point than either copper or "Kovar" in the position illustrated in Figure 4, so that it flows into the joint at brazing temperature when heated in the furnace 22, to be subsequently described, and is carried upward after melting by capillary action, to provide the brazing connection designated as 23 in Figure 5.

A preferred method of practicing our invention is, therefore, to assemble the parts to be brazed in the position illustrated in Figure 4, and enclose said parts in a covered boat 24, consisting of a base member 25 having a bottom aperture 26, and an enclosing cover member. The boat 24 with its parts 13 and 14 to be connected, which parts are desirably held upright in receptacles 28 resting on the base 25, are introduced into the furnace 22, which may be heated in any desired manner as by means of electric wires 29 and 31. The walls 32 of said furnace desirably comprise a filling of heat-insulating material 33. Protective gas may be introduced into the interior or heating chamber 34 therein by means of pipes 35 and 36.

The parts 13 and 14 are allowed to remain in the furnace protected by the carbonaceous gas heretofore described, which is introduced through the pipes 35 and 36, until the brazing material 21 has melted and formed the joint 23, as illustrated in Figure 5. The material 21, in the present instance, is desirably an alloy of silver and copper which has a melting point lower than that of copper, such as a 50–50 alloy, or the eutectic alloy comprising approximately 70% silver and 30% copper. It will, however, be understood that other alloys having suitable melting points may be employed for brazing, provided their vapor pressures are low if the connected parts are to be used in an X-ray or other evacuated device.

After the brazing treatment has been completed, the boat 24 and its contents are pushed from the furnace 22 into the communicating cooling chamber 37, which chamber may have its walls 38 hollow and cooled by water circulating therethrough by means of pipes 39 and 41. The cooling chamber 37 also may be supplied with cracked gas, like the furnace, as by means of a pipe 42. Pipe 43 extends through the bottom wall or floor of the cooling chamber 37, and the boat 24 is pushed to the position illustrated in dotted lines in Figure 1 and in section in Figure 2, where the aperture 26 in its base registers with said pipe 43, which pipe conducts a relatively small proportion of non-contaminating gas, such as carbon dioxide, nitrogen or hydrogen, in which the brazed devices are allowed to cool.

It will be understood that by driving out the contaminating carbonaceous gas from the boat immediately after the brazing operation has been performed, but before cooling appreciably, by an inert or non-contaminating gas, no injurious carbon pick-up or other contamination occurs and the necessity for a relatively expensive subsequent treatment in hydrogen, as was previously necessary, is avoided.

After the brazed parts have cooled sufficiently they are withdrawn from the cooling chamber through the exit door 44.

From the foregoing disclosure it will be seen that we have devised a method of brazing parts which makes it possible to mainly use a cheap gas and a relatively small proportion of a more expensive but non-contaminating gas, at the same time avoiding any possible injurious effect from using such cheap gas.

Although a preferred embodiment of our invention has been disclosed, it will be understood that modifications may be made within the spirit and scope of the appended claims.

We claim:

1. The method of brazing comprising heating the parts to be brazed and associated brazing metal in an atmosphere, which is protective against oxidation, but which has constituents apt to contaminate the parts while cooling from brazing temperatures, until the brazing metal melts to unite said parts, then replacing said atmosphere by a non-contaminating gas, and allowing the united parts to cool therein.

2. The method of brazing comprising inserting one part in a cavity in another, applying brazing material adjacent the junction between said parts, heating said parts in a carbonaceous atmosphere until the brazing material melts and fills the space therebetween, then replacing said atmosphere by a non-contaminating gas, and cooling said parts therein from brazing temperature.

3. The method of brazing comprising heating parts to be connected and associated brazing metal in a carbonaceous atmosphere until said brazing metal melts and unites said parts, and then moving said united parts to a cooling chamber and introducing a non-contaminating gas to said cooling chamber to replace said carbonaceous atmosphere.

4. The method of brazing comprising fitting one part in a cavity in another, applying brazing metal at the place of union between said parts, enclosing said parts in a housing, introducing said housing into a furnace, introducing a carbonaceous atmosphere into said furnace, heating said parts until the brazing metal melts and fills the space therebetween, moving said housing into a cooling chamber adjacent said furnace, and displacing the carbonaceous atmosphere in said housing during cooling of said parts by a gas which is non-contaminating.

5. The method of uniting an element of copper to a support comprising nickel, which involves inserting said support into a cavity in the copper, applying a brazing alloy of lower melting point then either copper or the support to the junction therebetween, inserting said parts into a furnace, introducing a carbonaceous atmosphere around said parts, applying heat by means of said furnace until said brazing alloy melts, fills the space between, and unites said parts, and then transferring said united parts while hot to a cooling chamber adjacent said furnace and introducing a non-contaminating gas into said cooling chamber during the cooling period.

6. The method of uniting an element of copper to a "Kovar" support comprising inserting said support into a cavity in the copper, applying a brazing alloy of lower melting point than either copper or "Kovar" to the junction therebetween, inserting said parts into a furnace, introducing a carbonaceous atmosphere around said parts, applying heat by means of said furnace until said brazing alloy melts, fills the space between, and unites said parts, and then transferring said united parts while hot to a cooling chamber adjacent said furnace and introducing a non-contaminating gas into said cooling chamber during the cooling period.

7. The method of uniting an element of copper to a nickel alloy support comprising fitting the support into a cavity in the copper, applying brazing metal at the place of union between said parts, enclosing said parts in a housing, introducing said housing into a furnace, introducing a carbonaceous atmosphere into said furnace, heating said parts until the brazing metal melts and fills the space therebetween, moving said housing into a cooling chamber adjacent said furnace, and displacing the carbonaceous atmosphere in said housing during cooling of said parts by a gas which is non-contaminating.

8. The method of uniting an element of metal to a support element of material adapted to seal directly to glass, comprising inserting an end of one into a cavity in the other, filling the space in said cavity around the other with a molten brazing alloy of lower melting point than either of said elements, while the parts are protected from oxidation in an atmosphere apt to be contaminating to the support element, before cooling displacing said atmosphere by one which is non-contaminating, and allowing the united parts to cool therein.

9. The method of uniting an element of copper to a support formed of nickel-cobalt-iron alloy, in which the proportion of nickel ranges between 28.7 and 29.2%, that of cobolt between 17.3 and 17.8%, and that of iron between 52.9 and 53.4%, comprising inserting an end portion of said support into a cavity in the copper, filling the space in said cavity around said end portion with a molten alloy of silver and copper, while the parts are protected by an atmosphere of carbon-bearing gas, before cooling of said parts replacing said carbon-bearing gas by one which has no tendency to contaminate the nickel-cobalt-iron alloy, and allowing the united parts to cool therein.

NELSON H. STEWART.
JOHN H. RAMAGE.